(12) United States Patent
Son et al.

(10) Patent No.: US 9,194,072 B2
(45) Date of Patent: Nov. 24, 2015

(54) WASHING APPARATUS AND CONTROL METHOD THEREOF

(75) Inventors: Young Bok Son, Changwon-si (KR); Ae Kyung Chae, Changwon-si (KR); Yong Cheol Jin, Changwon-si (KR); Yoon Seob Eom, Changwon-si (KR); Sang Hun Kim, Changwon-si (KR); Sung Min Ye, Changwon-si (KR)

(73) Assignee: LG Electronics Inc., Seoul (KR)

( * ) Notice: Subject to any disclaimer, the term of this patent is extended or adjusted under 35 U.S.C. 154(b) by 1114 days.

(21) Appl. No.: 13/143,793

(22) PCT Filed: Jan. 11, 2010

(86) PCT No.: PCT/KR2010/000160
§ 371 (c)(1),
(2), (4) Date: Jul. 8, 2011

(87) PCT Pub. No.: WO2010/080004
PCT Pub. Date: Jul. 15, 2010

(65) Prior Publication Data
US 2011/0271461 A1    Nov. 10, 2011

(30) Foreign Application Priority Data
Jan. 9, 2009  (KR) ........................ 10-2009-0001810

(51) Int. Cl.
| D06F 25/00 | (2006.01) |
| D06F 39/08 | (2006.01) |
| D06F 58/24 | (2006.01) |
| D06F 39/00 | (2006.01) |

(52) U.S. Cl.
CPC .............. *D06F 25/00* (2013.01); *D06F 39/006* (2013.01); *D06F 39/083* (2013.01); *D06F 58/24* (2013.01); *Y02B 40/56* (2013.01)

(58) Field of Classification Search
CPC ..... D06F 25/00; D06F 39/006; D06F 39/083; D06F 58/24; D06F 2204/08; D06F 2204/084; D06F 2226/00; Y02B 40/56
USPC .............................. 68/19.2, 20, 23 R, 24, 208
See application file for complete search history.

(56) References Cited

U.S. PATENT DOCUMENTS

2005/0081575 A1 *  4/2005  Park et al. ...................... 68/18 C
2005/0081576 A1 *  4/2005  Park et al. .......................... 68/20
2005/0223755 A1 * 10/2005  Hong et al. .................. 68/12.14

FOREIGN PATENT DOCUMENTS

| CN | 1464091 A   | 12/2003 |
| CN | 1464092 A   | 12/2003 |
| CN | 1834333 A   | 9/2006  |
| DE | 25 56 629 A1 | 6/1977  |
| EP | 0 607 628 A1 | 7/1994  |

(Continued)

OTHER PUBLICATIONS

Machine translation of CN 1464091, no date.*

(Continued)

*Primary Examiner* — Joseph L Perrin
(74) *Attorney, Agent, or Firm* — KED & Associates LLP

(57) ABSTRACT

A washing machine and a control method thereof are disclosed. The present invention relates to a washing machine, more specifically, to a washing machine that dehumidifies air used in drying laundry by using water thrown away after rinsing course, with flowing a condensation duct.

4 Claims, 2 Drawing Sheets

(56) References Cited

FOREIGN PATENT DOCUMENTS

| | | |
|---|---|---|
| EP | 1 548 173 A1 | 6/2005 |
| GB | 1 510 528 | 5/1978 |
| JP | 2002-369990 A | 12/2002 |
| JP | 2002-369992 A | 12/2002 |
| KR | 10-2008-0107789 A | 12/2008 |

OTHER PUBLICATIONS

Chinese Office Action dated Jan. 6, 2013 issued in Application No. 201080004349.2 (with English translation).
Korean Notice of Allowance dated Nov. 22, 2010 issued in Application No. 10-2009-0001810.
PCT International Search Report and Written Opinion dated Jul. 7, 2011 issued in Application No. PCT/KR2010/000160.

* cited by examiner

WASHING APPARATUS AND CONTROL METHOD THEREOF

CROSS-REFERENCE TO RELATED PATENT APPLICATIONS

This application is a U.S. National Stage Application under 35 U.S.C. §371 of PCT Application No. PCT/KR2010/000160, filed Jan. 11, 2010, which claims priority to Korean Patent Application No. 10-2009-0001810, filed Jan. 9, 2009.

TECHNICAL FIELD

The present invention relates to a washing machine, more specifically, to a washing machine that dehumidifies air used in drying laundry by using water thrown away after rinsing course, with flowing a condensation duct.

BACKGROUND ART

Washing machines are electric appliances that treat laundry and washing machines include washers, dryers and washers having a drying function.

Such a washing machine may be categorized into a drum type washing machine and a pulsator type, in other words, upright type washing machine. In the drum type washing machine, laundry loaded in a drum is lifted and dropped and washing is performed with a relatively small amount of water. In the pulsator type washing machine, a large amount of water is supplied to a drum vertically installed in a tub and laundry is rotated to be washed by both water currents and friction.

Dryers are electric appliances that dry washed laundry by using hot air. In general, a dryer include a drum receiving laundry, a driving source for driving the drum, heating means for heating air drawn into the drum and a blower unit for drawing or discharging the air inside the drum.

Such the dryer may be categorized based on a heating type, in other words, heating means into an electric type dryer and a gas type dryer. In the electric type dryer, air is heated by ohmic heating and in the gas type dryer, air is heated by using heat generated by gas combustion.

The dryer may be categorized into an exhaustion type dryer and a condensation, in other words, circulation type dryer. In the exhaustion type dryer, air is heat-exchanged with laundry inside the drum and damp air is directly exhausted outside the dryer. In the condensation type dryer, the damp air heat-exchanged with the laundry inside the drum is circulated, not exhausted outside, and an auxiliary condenser heat-exchanges the damp air and condensate generated by the condenser is discharged outside the dryer.

In the meanwhile, the condensation type dryer supplies water, which is the condensate, and it heat-exchange the water with the damp air flowing a condensation duct after discharged from the drum such that the damp air may be humidified. However, the condensate after heat-exchanging in the drying is discharged right away according to the conventional dryer. Because of that, too much water is consumed in the drying disadvantageously.

DISCLOSURE

Technical Problem

The present invention is invented to solve the above problem and an object of the present invention is to provide a washing machine that is able to minimize consumption of condensate used to dry laundry.

Technical Solution

To achieve these objects, a washing machine includes a cabinet; a tub provided in the cabinet to hold rinsing water; a drum rotatably provided in the tub; a condensation duct to condense and dehumidify air inside the drum and to re-supply the dehumidified air to the drum; a drain part to discharge the rinsing water held in the tub; and a condensate supply part to supply discharging water discharged via the drain part to the condensation duct as condensate. The condensate supply part may include a storage tank to store the discharging water.

The drain part may include a first drain pipe to draw the rinsing water held in the tub to the storage tank and a second drain pipe to discharge the discharging water stored in the storage tank outside the cabinet.

The washing machine may further include a supply pipe having an end connected to the second drain pipe and the other end connected to the condensation duct. The supply pipe may allow the condensate to move along an opposite direction of flow of air moving inside the condensation duct.

The washing machine may further include a control valve to control the discharging water stored in the storage tank to be discharged via the second drain pipe or supplied to the condensation duct via the supply pipe.

The washing machine may further include a condensate outlet pipe to discharge the condensate supplied to the condensation duct via the condensate supply part outside the cabinet.

The washing machine may further include a condensate outlet pipe to collect the condensate supplied to the condensation duct via the condensate supply part in the storage tank.

In another aspect of the present invention, a control method of a washing machine having a rinsing course performed at least two times, the control method includes a rinsing water discharging step to discharge rinsing water used in each time of the rinsing course; a determining step to determine whether the rinsing water discharged in each of the rinsing water discharging steps is rinsing water discharged in a final rinsing course; a condensate supplying step to supply the rinsing water discharged in the final rinsing course as condensate required in a drying step, if it is determined based on the result of the determining step that the rinsing water is the rinsing water discharged in the final rinsing course; and a rinsing water draining step to discharge the rinsing water outside the washing machine, if it is determined based on the result of the determining step that the rinsing water is not the rinsing water discharged in the final rinsing course.

The control method may further include a rinsing water storing step performed prior to the condensate supplying step to store the rinsing water, if it is determined based on the result of the determining step that the rinsing water is not the rinsing water discharged in the final rinsing course.

The control method may further include a measuring step performed posterior to the rinsing water storing step to measure the amount of the rinsing water stored in the rinsing water storing step.

The control method may further include an expecting step performed prior or posterior to the measuring step to expect the amount of the condensate required in the drying course.

The control method may further include a compare-determining step posterior to the condensate supplying step to compare the amount of the rinsing water measured in the measuring step with the amount of the condensate expected in the expecting step; and a condensate collecting step to collect the rinsing water supplied as condensate if it is determined based on the result of the compare-determining step that the amount of the required condensate is larger than the amount of the stored rinsing water.

Advantageous Effects

The present invention has following advantageous effects. As the rinsing water thrown away after the rinsing is utilized as condensate in the drying course, the amount of the condensate required in the drying course may be minimized as possible.

DESCRIPTION OF DRAWINGS

The accompanying drawings, which are included to provide further understanding of the disclosure and are incorporated in and constitute a part of this application, illustrate embodiments of the disclosure and together with the description serve to explain the principle of the disclosure.

In the drawings.

BEST MODE

Reference will now be made in detail to the specific embodiments of the present invention, examples of which are illustrated in the accompanying drawings. Wherever possible, the same reference numbers will be used throughout the drawings to refer to the same or like parts.

Figure 1:
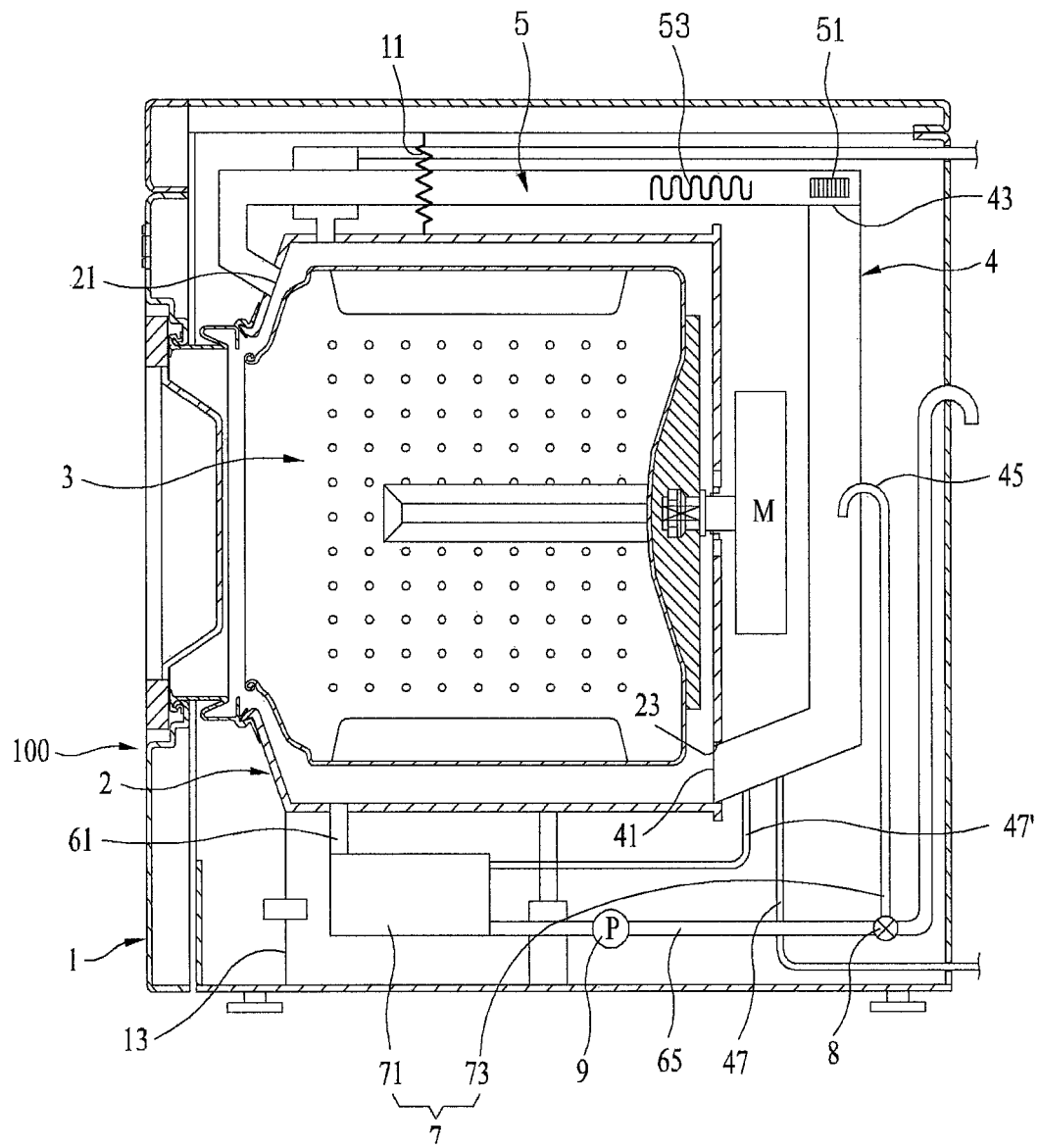
FIG. 1 is a conceptual diagram illustrating a washing machine according to an exemplary embodiment of the present invention.

FIG. 1 is a sectional view illustrating a concept of a washing machine according to an exemplary embodiment of the present invention.

As follows, a configuration of the washing machine according to the exemplary embodiment of the present invention will be described in reference to FIG. 1. Here, 'rinsing water' which will be described as follows is used as water supplied to the washing machine for rinsing and 'discharging water' is used as washing water discharged from a tub or rinsing water.

The washing machine 100 includes a cabinet 1, a tub 2, a drum 3, a condensation duct 4, a dry duct 5, a drain part 61 and 65, a condensate supply part 7, a control valve 8 and a pump 9. The cabinet 1 defines an exterior appearance of the washing machine 100. The tub 2 is provided in the cabinet 1 and the drum 3 is rotatably provided in the tub 2. The condensation duct 4 is connected to the tub 2 and the dry duct 5 connects the condensation duct 4 with the tub 2. The drain part 61 and 65 is connected to the tub 2 to discharge washing water. The condensate supply part 7 supplies discharging water from the tub to the condensation duct 4. The control valve 8 is provided in the drain part and the pump 9 is connected to the condensate supply part. The cabinet 1 defining the exterior appearance of the washing machine includes a spring 11 and a damper 13. The spring 11 and the damper 13 are coupled to upper and lower portions of the tub 2 which will be described later, respectively, to locate the tub in the cabinet 1.

The tub 2 is provided in the cabinet 1 to hold water required for washing and rinsing and the tub 2 includes an air inlet 21 to draw dry air supplied by a dryer, which will be described later, therein and an air outlet 23 to discharge the dry air outside via the drum.

The drum 3 is rotatable in the tub 2 and the laundry is loaded in the drum 3, rotated by a motor (M). If the drum 3 is rotated by the motor (M), the laundry is lifted by a lifer (not shown) provided in the drum to a predetermined height and the laundry falls. Then, friction occurs between the washing water held in the tub 2 and the laundry only to remove contaminants of the laundry. The condensation duct 4 is provided in a predetermined portion of the tub 2 to dehumidify damp air discharged via the drum 3 during the drying of the laundry. After discharging and dehumidifying the damp air, the condensation duct 4 guides the air into the dry duct 5. For that, the condensation duct 4 includes an inlet 41 to draw the damp air, an outlet 43 to discharging the dehumidified air, a through hole 45 to supply condensate for the dehumidification, and a condensate outlet pipe 47 to discharge the condensate having heat-exchanged.

The inlet 41 is connected to the air outlet 23 located in a lower portion of a rear surface of the tub 2 and the outlet 43 is connected to a predetermined portion of the dry duct 5 which will be described in detail later. The through hole 45 is a hole to pass a supply pipe 73 of the condensate supply part 7, which will be described later, there through and it passes through a predetermined portion of the condensation duct 4. The condensate outlet pipe 47 is a path to discharge the condensate supplied via the supply pipe 73 out of the condensation duct.

The condensate outlet pipe 47 has an end connected to a lower surface of the condensation duct and the other end in communication with an outside of the cabinet 1. The condensate after heat-exchanging may be discharged outside the cabinet. Here, in case the condensate after the heat-exchange is collected in a storage tank 71, which will be described later, and the condensate is re-supplied to the condensation duct 4, another condensate outlet pipe 47' may be provided, with an end of the condensate pipe 47 is connected to a lower surface of the condensation duct and the other end connected to the storage tank. Alternatively, the condensate outlet pipes 47 and 47' may be branched from a single pipe connected to the lower surface of the condensation duct. However, in this case, an auxiliary valve controlled by the control part (C, see FIG. 2) which will be described later may be further provided.

The dry duct 5 is provided beyond the tub 2 and it supplies the air heated after dehumidified via the condensation duct 4 to the drum via the air inlet 21 of the tub 2. The dry duct 5 may include a fan 51 blowing the air dehumidified in the condensation duct 4 to the tub and a heater 53 heating the dehumidified air.

Adjacent to the tub, the drain part is connected to a predetermined portion of the tub 2 to drain the water held in the tub 2 and it includes a first drain pipe 61 and a second drain pipe 65.

The first drain pipe 61 is connected to a lower surface of the tub 2 to drain the water inside the tub and the second drain pipe 65 has an end connected to the pump 9, which will be described later, and the other end in communication with an outside of the cabinet 1 to throw out the water discharged via the pump 9 outside the cabinet. As a result the rinsing water held in the tub 2 is thrown away outside the cabinet 1 via both of the first and second water drain pipes 61 and 65 by the pump 9, which will be described later.

To minimize the amount of condensate consumed in the drying course, the washing machine according to the present invention includes the condensate supply part 7 and the control valve 8 which are able to supply the rinsing water discharged in the rinsing course to the condensation duct 4.

The condensate supply part 7 stores the rinsing water thrown from the tub 2 temporarily and it supplies the rinsing water to the condensation duct during the drying course to dehumidify the damp air discharged from the drum. The condensate supply part 7 includes the storage tank 71, storing the discharging water thrown from the tub 2 and a supply pipe 73 supplying the discharging water stored in the storage tank 71 to the condensation duct 4.

The storage tank 71 is provided between the first drain pipe 61 and the second drain pipe 65 and it stores the discharging water which will be used as condensate. Although not shown in the drawings, the first and second drain pipes may be configured of a single pipe and the storage tank 71 may detour the single pipe that is a connected pipe of the first and second drain pipes. The supply pipe 73 has an end connected to the second drain pipe 65 and the other end connected to the through hole 45 of the condensation duct 4. Here, the supply pipe 73 is a path connecting the second drain pipe with the condensation duct 4 to allow the pump 9, which will be described later, to use the discharging water stored in the storage tank as condensate.

The control valve 8 is provided in the second drain pipe 65 and it selectively opens the supply pipe 73 and the second rain pipe 65 according to the control of the control part (C) which will be described later. The control valve 8 is in communication with the pump 9 which will be described later. As a result, if the supply pipe 73 is open, the discharging water stored in the storage tank 71 is supplied to the condensation duct 4 and, if the second drain pipe is open, the discharging water is discharged outside the cabinet 1. The detailed description of the control valve 8 may be diversified only if the above function is embodied. Alternatively, a single valve may be provided in a branched portion between the second drain pipe 65 and the supply pipe 73 and valves may be provided in the second drain pipe and the supply pipe, respectively.

If the control valve provided in the second drain pipe 65 is open and the control valve provided in the supply pipe 73 is closed in case the control valves 8 are provided in the second drain pipe 65 and the supply pipe 73, respectively, the discharging water is discharged outside the cabinet. If the control valve provided in the second drain pipe is closed and the control valve provided in the supply pipe is open, the control part controls the discharging water to move to the condensation duct.

The pump 9 is provided in a connection portion between the storage tank 71 and the second drain pipe 65. The pump 9 exhausts the water discharged via the first drain pipe 61 outside the cabinet 1 via the second drain pipe 65 or it supplies the water to the condensation duct via the supply pipe 73.

Figure 2:
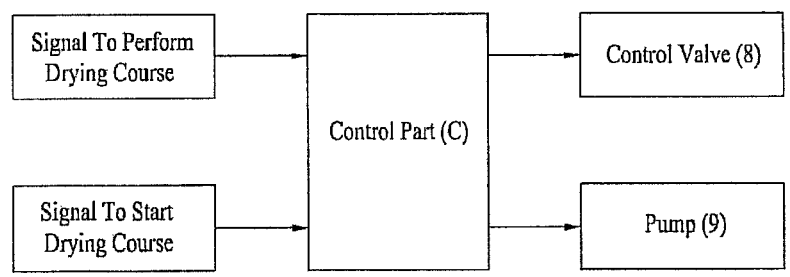
FIG. 2 is a conceptual diagram illustrating a control part.

The washing machine 100 according to the present invention may include the control part (C) that is able to control the control valve 8 and the pump 9. FIG. 2 is a conceptual diagram of the control part and the control part will be described in reference to FIG. 2.

The control part (C) receives an input signal to perform and start the drying course and it controls the control valve 8 and the pump 9 based on the input signal. As a result, if receiving an input signal not to perform the drying, the control part controls the control valve 8 to open the second drain pipe 65 and to close the supply pipe 73. Then, the control part operates the pump 9 and the wash water or rinsing water inside the tub is discharged outside the cabinet.

In contrast, if receiving an input signal to perform the drying, the control part controls the discharged water discharged from the tub to be stored in the storage tank 71 and if receiving the input signal to start the drying, the control part controls the control valve 8 to open the supply pipe 73 and to close the second drain pipe. After that, the control part operates the pump 9 to supply the discharging water stored in the storage tank 71 to the condensation duct 4.

In the meanwhile, the present invention may utilize only the rinsing water discharged in the rinsing course as condensate. If then, the control part (C) controls the control valve 8 and the pump 9 to discharge the water used in both washing and spinning courses outside the cabinet and the control part controls both of them to supply only the rinsing water used in the rinsing course to the condensation duct. It may be determined by using finish lights for courses preset in the washing machine whether water is discharged in the washing, rinsing or spinning course.

If the rinsing course of the washing machine with respect to the laundry is performed more than two times, only the discharging water discharged in a final rinsing course may be stored in the storage tank and the stored water may be used in the drying course as condensate.

To the discharging water discharged in the final rinsing course as condensate, the control part (C) may control the washing machine to calculate the amount of the condensate required in the drying course in advance.

For example, if the control part (C) is provided with data of the drying time according to the amount of the laundry and data of the amount of the required rinsing water according to the amount of the laundry in advance, the amount of the condensate required for condensation as soon as the washing starts may be compared with the amount of the discharging water which will be discharged in the final rinsing course in advance. As a result, if the amount of the discharging water discharged in the final rinsing course is smaller than the amount of the required condensate, the discharging water discharged as condensate in the drying course is collected in the storage tank 71 via the condensate output pipe 47' mentioned above and then the water may be controlled to be circulated until the drying course finishes.

If the amount of the required condensate for the condensation is satisfied by only the amount of the discharging water discharged in the final rinsing course, the control part (C) controls to store only the discharging water discharged in the final rinsing course and the water is supplied as condensate. Then, the discharging water having heat-exchanged is discharged outside the cabinet via the condensate outlet pipe 47.

In the above case, it may be determined by using course finish signals, as used in determining identification between the rinsing course and the other courses, whether the discharging water is discharged in the final rinsing course. Also, the method for calculating the amount of the required condensate may be expected from both the data of the drying time according to the laundry amount and the amount of the condensate that can be supplied via the supply part 73 per unit hour.

As follows, the operation of the washing machine 100 including the above configuration will be described.

First of all, the control part (C) determines whether the signal to perform the drying course is inputted. If receiving no input signal to perform the drying course, the control part (C) controls the control valve 8 and the pump to drain the discharging water outside the cabinet 1.

However, if receiving the input signal to perform the drying course, the control part (C) controls to store condensate required during the drying course. As a result, the washing machine 100 according to the present invention has the rinsing water discharged in the rinsing course to be stored in the storage tank 71.

Once the discharging water which will be described as condensate is stored, the control part (C) waits an input signal to start the drying course, controlling the discharging water which will be used as condensate to be stored.

In case the condensation is performed by using only the rinsing water discharged in the final rinsing course according to the washing machine having the rinsing courses performed more than two times, the control part discharges the rinsing water discharged before the final rinsing outside the cabinet right away and it waits an input signal to start the drying course after storing the rinsing water discharged in the final rinsing course.

After the discharging water which will be used as condensate is collected, the drying course starts. Once the drying course starts, the dry duct 5 supplies heated air to the drum 3 via the air inlet 21. The dried air supplied to the drum 3 dries the dry-spun laundry inside the drum 3 only to be damp air and then the damp air is drawn into the inlet 41 of the condensation duct 4 via the air outlet 23 of the tub.

Here, if receiving the input signal to start the drying course, the control part (C) controls the control valve 8 to close the second drain pipe 65 and to open the supply pipe 73. Hence, the control part (C) operates the pump 9 to supply the discharging water stored in the storage tank 71 to the condensation duct 4 via the supply pipe 73. as a result, the damp air drawn into the condensation duct 4 via the inlet 41 is heat-exchanged with the discharging water and dehumidified while moving toward the dry duct 5

The discharging water having heat-exchanged with the damp air is thrown outside the cabinet 1 via the condensate outlet pipe 47 provided under the condensation duct.

Here, if the amount of the discharging water held in the storage tank is smaller than the amount of the condensate required in the drying course, the discharging water having heat-exchanged is re-collected in the storage tank 71 to be used as condensate. In this case, the end of the condensate outlet pipe 47' has to be connected to the lower surface of the condensation duct 4 and the other end thereof has to be connected to the storage tank 71. The discharging water collected in the storage tank 71 after heat-exchanging may be discharged outside the cabinet finally by the valve and the pump.

In the meanwhile, the supply pipe 73 may supply the condensate in an opposite direction of the flow of the damp air moving inside the condensation duct. This configuration is described above and its detailed description will be omitted accordingly.

The air after dehumidification is supplied to the dry duct 5 via the outlet 43 of the condensation duct 4 by the fan 51. Hence, after it is heated by the heater 53 provided in the dry duct 5, the air is re-supplied to the tub 2 via the air inlet 21 of the tub to dry the laundry held in the drum 3.

Figure 3:
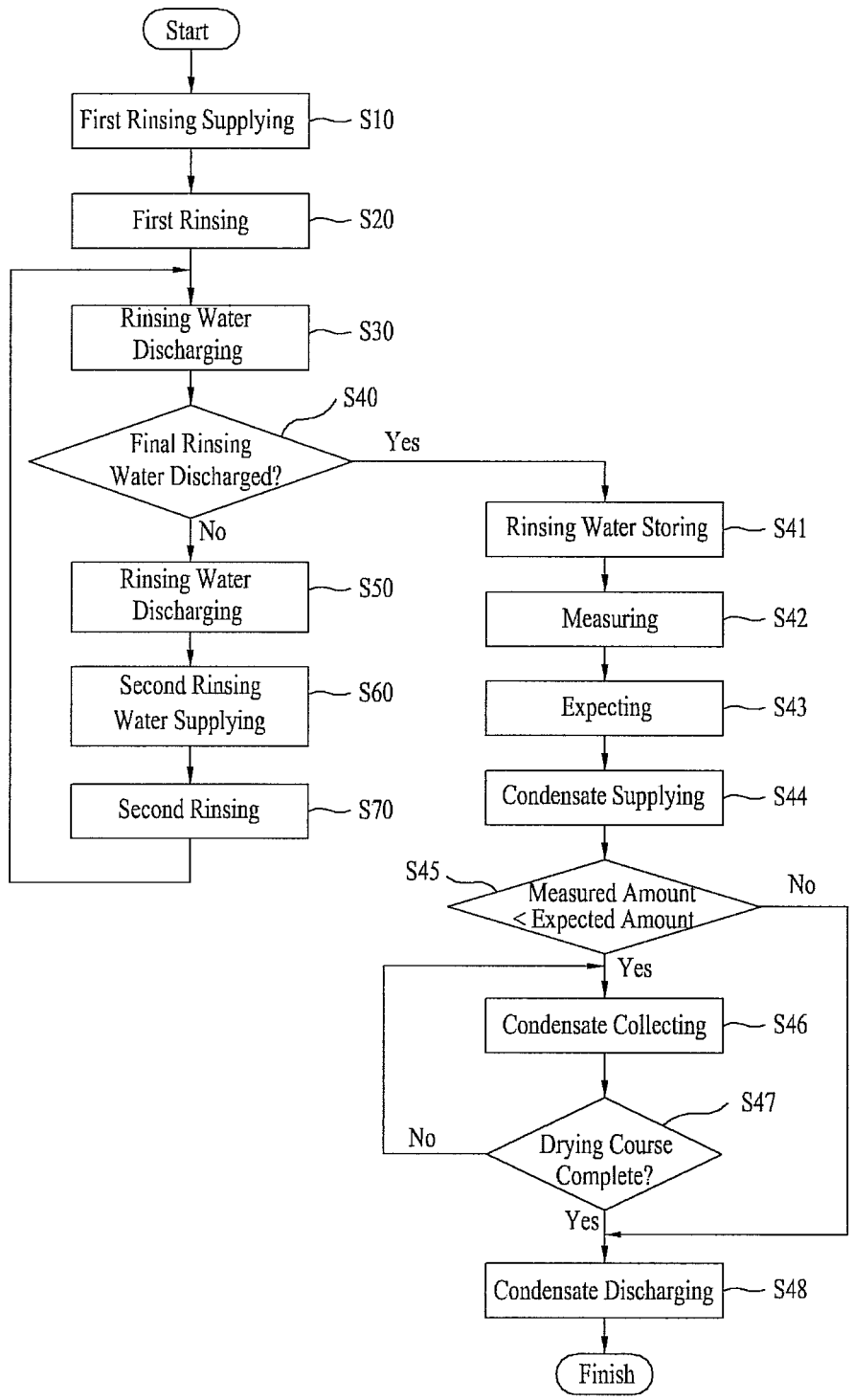
FIG. 3 is a flow chart illustrating a control method of the washing machine according to the present invention.

FIG. 3 is a flow chart illustrating a control method of the washing machine according to the present invention.

As follows, a control method of the washing machine having the rinsing course performed more than two times will be described in reference to FIG. 3.

A first-rinsing water-supply step (S110) is performed to rinse the laundry and a first rinsing step (s20) and a rinsing water discharging step (S30) are performed. Once the rinsing water discharging step (S30) is complete, a determining step (S40) is performed to determine whether the discharged rinsing water is rinsing water discharged in the final rinsing course. Here, the final rinsing course is referenced to as a final rinsing course of the washing machine having the rinsing course performed more than two times. In case the rinsing courses performed two times are provided, a second rinsing course may be the final rinsing course.

If it is determined that the discharged rinsing water is not the final rinsing water in the determining step (S40), a rinsing water draining step (S50) is performed to discharge the rinsing water outside the cabinet. Then, the next priority rinsing steps, that is, second rinsing water supplying (S60) and second rinsing steps may be performed.

Once the second rinsing is complete, the rinsing water discharging step (S30) and the determining step (S40) are re-performed. At this time, the determining step (S40) determines that the rinsing water is the discharge of the final rinsing water and a rinsing water storing step (S41) is performed to store the discharged rinsing water in the storage tank 71.

Once the rinsing water storing step (S41) is complete, the control part (C) performs a measuring step (S42) to measure the amount of the stored rinsing water and an expecting step (S43) to expect the amount of the condensate required in the drying course sequentially or simultaneously.

If the amount of the rinsing water is measured and the amount of the condensate is expected, a condensate supplying step (S44) is performed to supply the stored rinsing water to the condensation duct.

While the condensate supplying step (S44) is performed, a compare-determining step (S45) is performed to compare the amount of the rinsing water measured in the measuring step (S42) with the amount of the condensate expected in the expecting step (S43).

If it is determined based on the result of the compare-determining step (S45) that the measured amount of the rinsing water is smaller than the expected amount of the condensate, a condensate collecting step (S46) is performed according to the control method of the washing machine to collect condensate in the storage tank 71 by using the condensate outlet pipe 47'. As a result, even if the condensate required in the drying course is not satisfied by only the stored final rinsing water, the condensate may be supplied.

The determining step (S47) is performed next to the condensate collecting step (S46) and the condensate collecting step (S46) is performed continuously until the drying course is complete. Once the drying course is complete, a condensate discharging step (S48) is performed to discharge the collected condensate outside the cabinet.

However, if it is determined based on the result of the compare-determining step (S45) that the measured amount of the rinsing water is larger than the expected amount of the condensate, the condensate discharging step (S48) is performed by using the condensate outlet pipe 47'.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A washing machine comprising:
   a cabinet;
   a tub provided in the cabinet to hold rinsing water;
   a drum rotatably provided in the tub;
   a condensation duct to condense and dehumidify air inside the drum and to re-supply the dehumidified air to the drum;
   a drain part to discharge the rinsing water held in the tub;
   a condensate supply part to supply discharging water discharged via the drain part to the condensation duct as condensate, wherein the condensate supply part includes a storage tank to store the discharging water; and a condensate outlet pipe to discharge the condensate having been heat-exchanged and to collect the condensate supplied to the condensation duct via the condensate supply part in the storage tank, the condensate outlet pipe having a first end connected to a lower surface of the condensation duct and a second end connected to the storage tank, wherein the drain part includes a first drain pipe to draw the rinsing water held in the tub to the storage task and a second drain pipe to discharge the discharging water stored in the storage tank to outside the cabinet.

2. The washing machine as claimed in claim 1, further comprising:

a supply pipe having a first end connected to the second drain pipe and a second end connected to the condensation duct.

3. The washing machine as claimed in claim 2, wherein the supply pipe allows the condensate to move along an opposite direction of flow of air moving inside the condensation duct.

4. The washing machine as claimed in claim 2, further comprising:

a control valve to control the discharging water stored in the storage tank to be discharged via the second drain pipe or supplied to the condensation duct via the supply pipe.

* * * * *